United States Patent [19]

Clerke

[11] Patent Number: 4,780,858
[45] Date of Patent: Oct. 25, 1988

[54] BOREHOLE TELEVIEWER MUDCAKE MONITOR

[75] Inventor: Edward A. Clerke, Missouri City, Tex.

[73] Assignee: Shell Oil Company, Houston, Tex.

[21] Appl. No.: 947,058

[22] Filed: Dec. 29, 1986

[51] Int. Cl.$^4$ .............................................. G01V 1/40
[52] U.S. Cl. ...................................... 367/35; 367/29; 367/69; 181/105
[58] Field of Search ...................... 367/35, 69, 29, 25; 181/105

[56] References Cited

U.S. PATENT DOCUMENTS

| 3,175,639 | 3/1965 | Liben | 367/35 |
| 4,524,433 | 6/1985 | Broding | 367/86 |
| 4,646,565 | 3/1987 | Siegfried | 73/152 |
| 4,658,383 | 4/1987 | Zimmer | 367/29 |
| 4,692,908 | 9/1987 | Elkstrom et al. | 367/27 |

Primary Examiner—Thomas H. Tarcza
Assistant Examiner—Ian J. Lobo

[57] ABSTRACT

In connection with a borehole televiewer system (10), the delta time (51) between low threshold (54) crossing ($T_1$) and signal peak arrival ($T_2$) provides a measure of mudcake (43) thickness.

4 Claims, 2 Drawing Sheets

BOREHOLE TELEVIEWER MUDCAKE MONITOR

BACKGROUND OF THE INVENTION

The present invention relates to well logging, and in particular to improvements in a borehole logging tool referred to as a borehole televiewer, or BHTV. Tools of this type are described, for example, in U. S. Pat. Nos. 3,369,626 (Zemanek, Jr., issued Feb. 20, 1968), 3,478,839 (Zemanek, Jr., issued Nov. 18, 1969), 4,463,378 (Rambow, issued July 31, 1984), and 4,601,024 (Broding, issued July 15, 1986).

In general, borehole televiewer logging tools operate acoustically by periodically pulsing a rotating acoustic transducer to emit a sequence of acoustical pulses directionally into the borehole toward the borehole wall, and analyzing the echoes which are reflected back to the tool. The amplitude of the reflected signal may then be displayed on a cathode ray tube, the display sometimes being photographed for future reference. Typically, the display represents a map of the borehole wall split along the north direction and laid out flat. Alternatively, a polar display may be produced, in which case the radius of the circular trace is determined by the time-of-flight of the acoustic pulse, thus presenting a cross-sectional profile of the borehole. Another display, similar to the amplitude display, is modulated by the time-of-flight signal rather than the amplitude signal. The latter can be converted into a pseudo-three-dimensional image by adding a slight bias to the vertical sweep according to the magnitude of the time-of-flight signal. BHTV tools typically include means for monitoring the tool orientation within the borehole, such as a fluxgate magnetometer rotating in unison with the transducer. A good technical description of a borehole televiewer suitable for use in a geothermal environment may be found in "Development of a Geothermal Acoustic Borehole Televiewer", by Fred B. Heard and Tom J. Bauman, Sandia report SAND83-0681, August 1983.

As shown in the above-noted publications, borehole televiewers scan radially, typically with a single transducer, essentially looking at a small ring encircling the transducer in the transverse plane thereof. As the borehole televiewer is then moved vertically through the borehole, the path or trail of this ring, as it moves along the borehole wall, in turn describes the wall. This description is then accumulated to generate the displays discussed above.

One of the principal and extremely valuable benefits furnished by the BHTV logging tool is thus the pseudo "visual" image of the borehole wall which it furnishes. Subtleties in the formation, bedding, bedding planes, dip, and so forth, can be observed and studied in a manner unavailable elsewhere. Especially in the oil industry, conventional optical viewing devices do not suffice, in part due to the typically extremely hostile environment, but primarily because the fluid medium in the borehole is normally opaque to optical energy.

Very often, other information about the borehole, borehole environment, and the formations penetrated by the borehole is desired, in addition to the images furnished by the borehole televiewer. Time is usually of the essence while such logs of a borehole are being generated, so several types of logging tools may be stacked together on a string to log the borehole simultaneously. Whenever additional information can be obtained from essentially the same equipment, therefore, it can be highly advantageous.

SUMMARY OF THE INVENTION

Briefly, the present invention provides a substantial improvement, particularly well adapted for use with borehole televiewers, which monitors and determines the thickness of the mudcake on the wall of the borehole. This additional and important borehole parameter can be provided inexpensively with very little modification of existing borehole televiewer type tools.

At the heart of the present invention is the recognition that when the acoustic energy pulse travelling away from the borehole televiewer encounters mudcake on the wall of the borehole it also encounters a change in the acoustical impedance as it moves from the liquid (or "mud" as the drilling mixture is typically called) in the borehole into the mudcake lining the borehole wall. As is well known, such an impedance mismatch will usually cause some of the energy to be reflected back at this interface. The result is a weak precursor reflection which arrives back at the borehole televiewer slightly ahead of the main reflection from the borehole wall. (Of course, the main reflection at the borehole wall is also an impedance mismatch phenomenon, resulting from the differences in the impedance of the mudcake and the borehole wall at the mudcake/borehole wall interface.) Therefore, by detecting reflection of the acoustic energy from the mudcake at the borehole/mudcake interface, and then detecting reflection of the acoustic energy from the borehole wall at the mudcake/borehole wall interface, and comparing the difference in these reflections (e.g., the difference in the arrival times back at the borehole televiewer), a good determination of the mudcake thickness can be made.

It is therefore an object of the present invention to provide an improved method and apparatus for determining the thickness of mudcake on the wall of a borehole; such a method and apparatus which can conveniently and readily be implemented in a borehole televiewer for monitoring such mudcake thickness; in which acoustic energy is directed from within the borehole toward the mudcake; in which reflection of the acoustic energy from the mudcake at the borehole/mudcake interface is detected; in which reflection of the acoustic energy from the borehole wall at the mudcake/borehole wall interface is also detected; in which the thickness of the mudcake is then determined from the difference in the detected mudcake and borehole wall reflections; in which the difference from which the determination is made can conveniently be the difference in the time between detecting the two reflections; in which a predetermined threshold may be used such that the reflected acoustic energy level must rise above the threshold for indicating a returned reflection from the mudcake at the borehole/mudcake interface; in which the reflection of the acoustic energy from the borehole wall at the mudcake/borehole wall interface may be detected when the reflected acoustic energy level reaches a peak; and to accomplish the above objects and purposes in an inexpensive, uncomplicated, versatile and reliable method and apparatus, inexpensive to manufacture and implement, and readily suited to the widest possible utilization in borehole logging applications.

These and other objects and advantages of the invention will be apparent from the following description, the accompanying drawings, and the appended claims.

DESCRIPTION OF THE PREFERRED EMBODIMENTS

Figure 1:
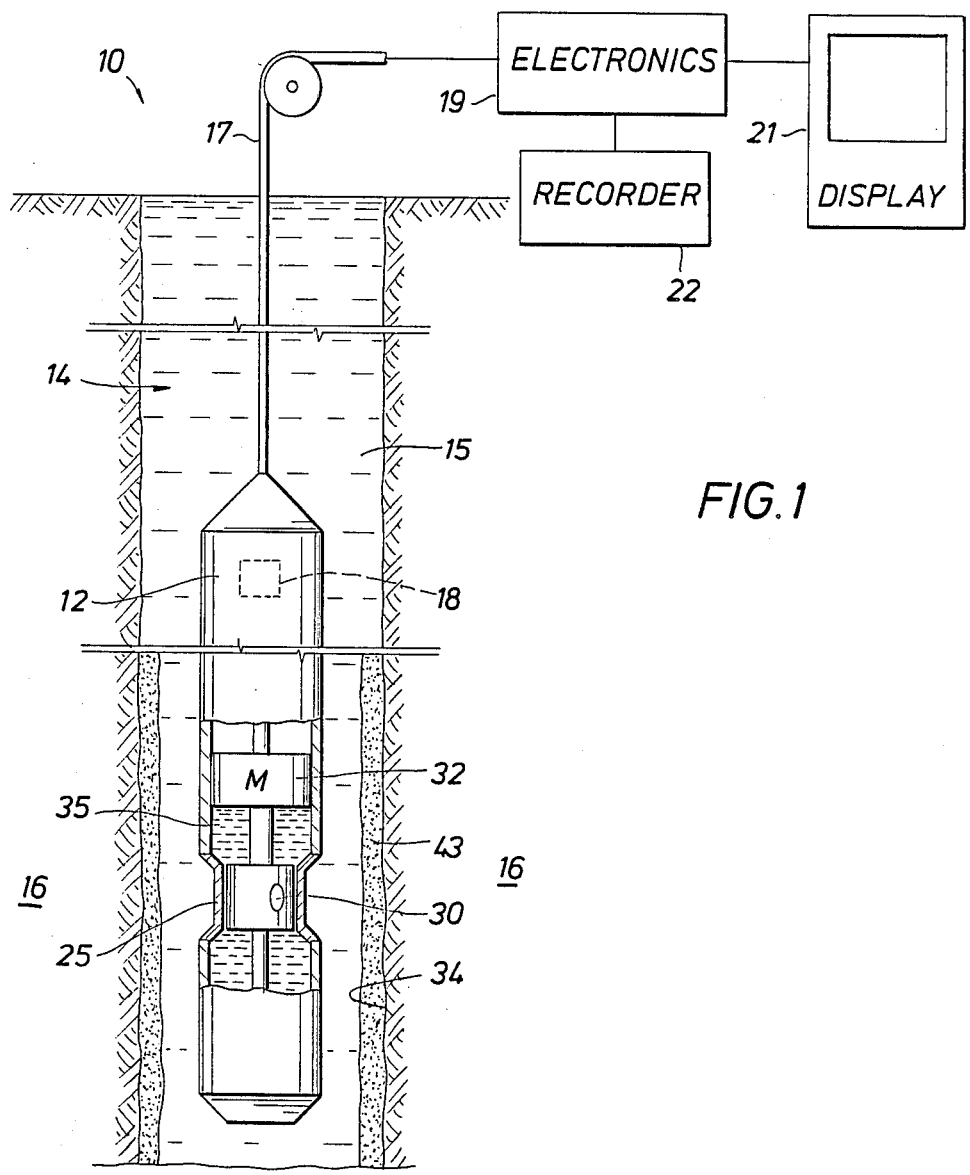
FIG. 1 is a somewhat figurative, partially broken-away illustration showing a borehole logging apparatus according to the present invention located within a borehole.

With reference to the drawings, the new and improved borehole imaging apparatus, and the method for imaging a borehole therewith, according to the present invention, will be described. A borehole televiewer system 10, including a downhole sonde having a housing 12, is positioned in a borehole 14 filled with a fluid drilling mud 15. Borehole 14 penetrates various earth formations 16 which are to be imaged by the borehole televiewer.

The sonde housing 12 is supported in borehole 14 by a conventional logging cable 17. Cable 17 provides both physical support for moving the sonde vertically within borehole 14, and also is a communications link between the electronic package 18 located in housing 12 and the surface electronics 19 located at the top of borehole 14. System 10 may also include a suitable display unit 21, such as a CRT display, and a recorder such as a video recorder 22.

Around the periphery of housing 12 is an acoustic window 25 made of a material, such as polymethylpentene, which is durable and tolerant of the extremely demanding conditions encountered in borehole logging. Window 25 also has an acoustic impedance closely matching that of typical borehole fluids such as the drilling mud 15 located in borehole 14.

Within housing 12, and mounted for rotation on the longitudinal axis of the housing, is an acoustic transducer 30. Driven by a drive motor 32, the transducer 30 then sweeps radially around the housing 12, projecting acoustic pulses outwardly through acoustic window 25 and receiving reflections back from the wall 34 of the borehole 14. The portion of the housing 12 in which the acoustic window 25 is located is filled with an acoustic fluid 33, such as an incompressible liquid, rather than a gas, such as air.

Figure 2:
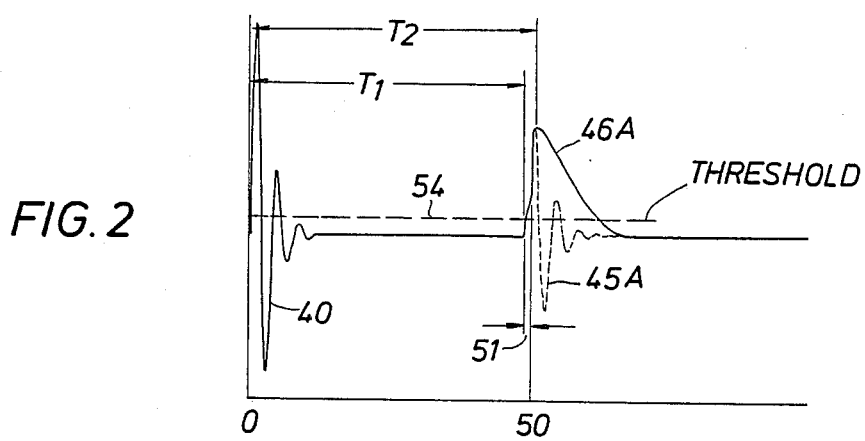
FIGS. 2-6 illustrate the waveforms relating to the present invention associated with increasing mudcake thickness.

Referring now to FIG. 2, there is illustrated on the left portion of the drawing a typical acoustic energy pulse 40 ("source" pulse), having a short ringdown time, as it would appear being emitted into the borehole by transducer 30. For purposes of this illustration, as well as FIGS. 3-6, it is assumed that the acoustic velocities in the mud 15 and the mudcake 43 (FIG. 1) are both 5,000 ft/sec., and in the formation rock 16, 12,000 ft/sec. The mud density is assumed to be 1.2 gm/cc, the mudcake 1.8 gm/cc, and the rock 2.3 gm/cc. A pulse loop cycle time for generating the source pulse 40 of 4 microseconds was used, which is equivalent to a frequency of 250 kHz. At this frequency, one wave length in mud or mudcake would be 0.24 inches. So that the phenomena can be readily illustrated, the rock face (borehole wall) 34 of the earth formation 16 is positioned so that the rock reflections 45 will occur at 50 microseconds in all plots. The dotted lines 45 represent the actual waveform to be expected in the reflected signal. The solid lines 46 represent the waveform observed by the surface electronic package 19 after the signal is smoothed out as a result of the response envelope of the various portions (transducer 30, tool electronics 18, cable 17, surface electronics 19, etc.) of the borehole televiewer system. The smoothing effect of the system 10 response envelope will depend, of course, on the band width response of the tool and the way in which the signal is processed (e.g. rectification, feeding through line drivers, etc.).

FIG. 2 illustrates the effect when the mudcake is approximately $\frac{1}{8}$th wave length thick (0.03 in.). Due to the reflection at the mudcake surface, the reflection signal 46A arrives sooner at the transducer 30, by a time represented by the interval 51, than the 50 microsecond time which is expected from the earth formation wall 34 itself. Since it may be difficult to distinguish the exact beginning of the reflection pulse from background and system noise, a threshold level 54 is preferably established and the time $T_1$ at which the reflection 46A exceeds the acoustic energy level 54 is detected to indicate the reflection of acoustic energy from the mudcake 43 at the borehole/mudcake interface. Very shortly thereafter, at time $T_2$, reflection 46A reaches a peak which may conveniently be used to detect the reflection of the acoustic energy from the borehole wall 34 at the mudcake/borehole wall interface.

Figure 3:
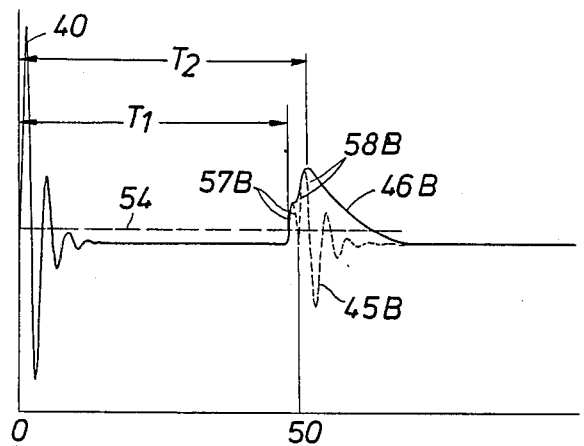

FIG. 3 represents a mudcake of $\frac{1}{4}$th wave length thickness, the waveforms 45B and 46B corresponding to 45A and 46A in FIG. 2. Here the mudcake reflection 57B is now clearly distinguished from the rock reflection 58B, although they are smoothed out in the tool output waveform 46B. The difference between $T_1$ and $T_2$ in this figure clearly illustrate the ease with which the mudcake precursor reflection can be detected and utilized, as the waveform 46B crosses the threshold 54, to indicate the thickness of the mudcake.

Figure 4:
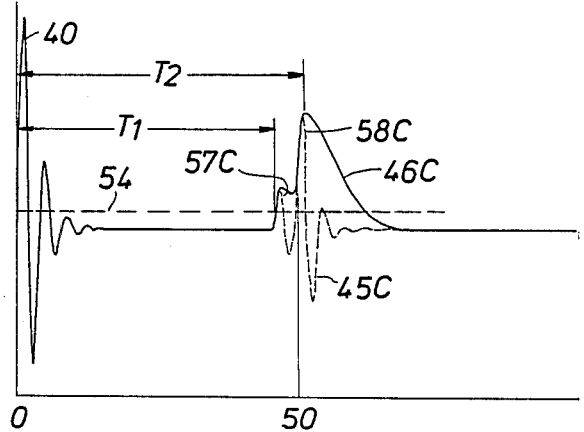

In FIG. 4, the mudcake reflection 57C, resulting from a mudcake thickness of $\frac{1}{2}$ wave length, is now clearly affecting the tool reflection signal 46C. Thus, although the waveform 46C now has two peaks, clearly the second and highest peak will be recognized as the "true" peak representing the rock reflection 58.

Figure 5:
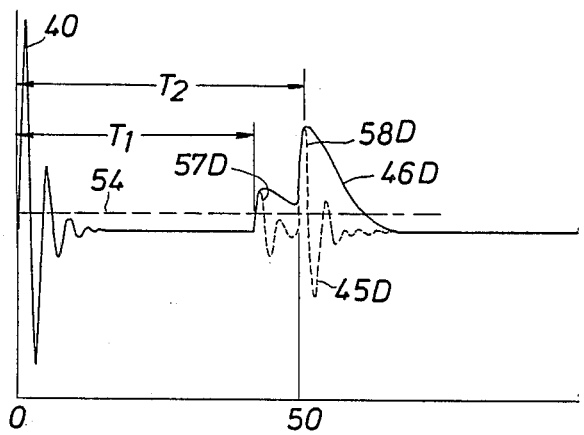
Figure 6:
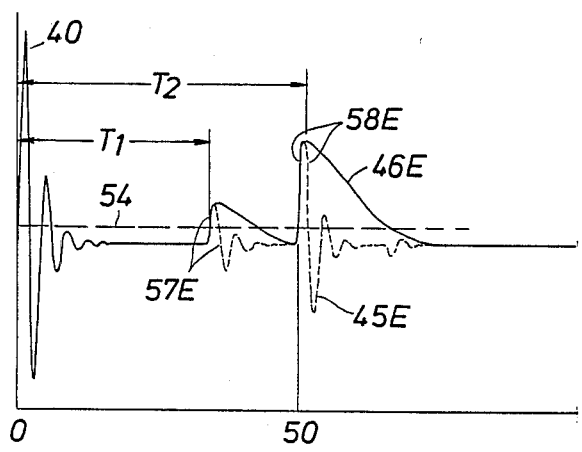

FIGS. 5 and 6, representing a mud thickness of 1 wave length and 2 wave lengths, respectively, extend the pattern just discussed. Note that the peak representing the rock reflection 58 occurs at substantially the same time regardless of the mudcake thickness (FIGS. 2-6). Therefore, since time $T_2$ is substantially constant regardless of mudcake thickness, the mudcake thickness can be readily determined by the changes in time $T_1$.

As may be seen, therefore, the present invention has numerous advantages. In the preferred embodiment, the mudcake thickness is readily determined by looking at the delta time between the low threshold crossing of the weak precursor reflection (from the borehole/mudcake interface) and the signal peak arrival (from the mudcake/borehole wall interface). Even when the mudcake is very thin ($\frac{1}{4}$ to 1 wavelength), wherein alternating constructive and destructive interference, the length of the pulse ringdown, and the relative mud to mudcake and mudcake to formation reflection coefficients, can all affect the formation reflection amplitude in a complicated way, the viability of the present invention can clearly be seen.

Another important advantage of the present invention is that it can be readily and easily implemented with very little modification of existing, advanced performance borehole televiewer systems. In those systems, where response characteristics such as those shown in the drawing figures are available, a little additional signal processing according to the present invention will yield mudcake thickness simultaneously with the generation of the borehole televiewer images.

Once the principle of the present invention is understood, various modifications thereof will also become apparent to those skilled in the art, and are intended to be comprehended within the scope of the present disclosure. For example, with sufficiently sensitive equipment, the differential time of flight in the mudcake can be used as an indication of the thickness thereof. That is, a residual delta time of flight is normal for no mudcake and finite rise time of the signal. Larger values of the delta time of flight are then related to the presence of mudcake. Similarly, under appropriate conditions, the rise time of the signal changes as a function of the mudcake thickness. Therefore, deviations from a residual slope can also be used as an indication of mudcake thickness.

Therefore, while the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A method for determining the thickness of mudcake on the wall of a borehole, comprising:
   directing acoustic energy, from a borehole televiewer within the borehole, toward the mudcake;
   detecting the precursor reflection of the acoustic energy from the mudcake at the borehole/mudcake interface by detecting the time $T_1$ when the reflected precursor acoustic energy level rises above a predetermined threshold level greater than the background noise level and less than the later signal peak of the reflected acoustic energy;
   detecting the time $T_2$ of the reflection of the acoustic energy from the borehole wall at the mudcake/borehole wall interface by detecting the later signal peak arrival of the reflected acoustic energy; and
   determining the thickness of the mudcake from the difference $T_2-T_1$ in the detected mudcake and borehole wall reflection times.

2. A method of using a borehole televiewer for determining the thickness of mudcake on the wall of a borehole, comprising:
   directing a pulse of acoustic energy, from a borehole televiewer within the borehole, substantially radially outwardly toward the mudcake;
   detecting the precursor reflection of the acoustic energy pulse back to the borehole televiewer from the mudcake at the borehole/mudcake interface by detecting when the reflected precursor acoustic energy level rises above a predetermined threshold level greater than the background noise level and less than the later peak level of the reflected acoustic energy;
   detecting reflection of the acoustic energy pulse back to the borehole televiewer from the borehole wall at the mudcake/borehole wall interface by detecting when the reflected acoustic energy level later reaches a peak; and
   determining the thickness of the mudcake from the difference in the time between said detecting of the borehole/mudcake interface reflection and the mudcake/borehole wall interface reflection.

3. A borehole televiewer adapted for determining the thickness of mudcake on the wall of a borehole, comprising:
   means on said borehole televiewer for directing acoustic energy from within the borehole toward the mudcake;
   means on said borehole televiewer for detecting the precursor reflection of the acoustic energy from the mudcake at the borehole/mudcake interface by detecting the time $T_1$ when the reflected precursor acoustic energy level rises above a predetermined threshold level greater than the background noise level and less than the later signal peak of the reflected acoustic energy;
   means for detecting the time $T_2$ of the reflection of the acoustic energy from the borehole wall at the mudcake/borehole wall interface by detecting the late signal peak arrival of the reflected acoustic energy; and
   means for determining the thickness of the mudcake from the difference $T_2-T_1$ in the detected mudcake and borehole wall reflection times.

4. A borehole televiewer adapted for determining the thickness of mudcake on the wall of a borehole, comprising:
   transducer means on said borehole televiewer for directing a pulse of acoustic energy, from within the borehole, substantially radially outwardly toward the mudcake;
   transducer means on said borehole televiewer for detecting the precursor reflection of the acoustic energy pulse back to the borehole televiewer from the mudcake at the borehole/mudcake interface by detecting when the reflected precursor acoustic energy level rises above a predetermined threshold level greater than the background noise level and less than the later peak level of the reflected acoustic energy;
   transducer means on said borehole televiewer for detecting reflection of the acoustic energy pulse back to the borehole televiewer from the borehole wall at the mudcake/borehole wall interface by detecting when the reflected acoustic energy level later reaches a peak; and
   means associated with said borehole televiewer for determining the thickness of the mudcake from the difference in the time between the detected mudcake and borehole wall reflections.

* * * * *